(12) United States Patent
Speker et al.

(10) Patent No.: US 8,017,885 B2
(45) Date of Patent: Sep. 13, 2011

(54) LASER MACHINING NOZZLE IDENTIFICATION

(75) Inventors: Nicolai Speker, Pleidelsheim (DE); Carsten Stegemann, Bottrop (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 782 days.

(21) Appl. No.: 12/126,384

(22) Filed: May 23, 2008

(65) Prior Publication Data

US 2008/0290074 A1 Nov. 27, 2008

(30) Foreign Application Priority Data

May 23, 2007 (DE) .......................... 10 2007 024 288

(51) Int. Cl.
*B23K 26/42* (2006.01)

(52) U.S. Cl. ........... 219/121.6; 219/121.63; 219/121.67; 219/121.83

(58) Field of Classification Search ............... 219/121.6, 219/121.63–121.72, 121.83, 121.85
See application file for complete search history.

(56) References Cited

U.S. PATENT DOCUMENTS

| | | | | |
|---|---|---|---|---|
| 4,577,345 A | * | 3/1986 | Abramov | 382/124 |
| 4,794,222 A | | 12/1988 | Funayama et al. | |
| 5,160,824 A | * | 11/1992 | Babel | 219/121.68 |
| 6,359,256 B1 | | 3/2002 | Biermann et al. | |
| 6,519,838 B1 | * | 2/2003 | Okuda et al. | 29/740 |
| 2005/0061790 A1 | | 3/2005 | Lambert et al. | |
| 2005/0263510 A1 | * | 12/2005 | Yamazaki et al. | 219/121.84 |

FOREIGN PATENT DOCUMENTS

| | | |
|---|---|---|
| DE | 4035403 | 5/1992 |
| DE | 20010075 | 9/2000 |
| DE | 10056330 | 3/2002 |
| EP | 0 507 268 | 10/1992 |
| EP | 1329277 | 7/2003 |
| EP | 1506833 | 2/2005 |
| GB | 2299777 | 10/1996 |
| JP | 10006062 | 1/1998 |

OTHER PUBLICATIONS

Translation of Communication from the German Patent Office regarding corresponding German Application No. 10 2007 024 288. 5, mailed Oct. 31, 2007, 4 pages.

* cited by examiner

*Primary Examiner* — Samuel M Heinrich
(74) *Attorney, Agent, or Firm* — Fish & Richardson P.C.

(57) ABSTRACT

A system for identifying a laser machining nozzle on insertion of the laser machining nozzle into a laser machining head is provided. On its region insertable into the laser machining head, the laser machining nozzle has a shaping. Means for detecting or sensing the shaping are provided in the receiving region of the laser machining head provided for the laser machining nozzle.

21 Claims, 5 Drawing Sheets

LASER MACHINING NOZZLE IDENTIFICATION

CROSS REFERENCE TO RELATED APPLICATION

This application claims priority under 35 U.S.C. §119(a) to German Patent Application No. 10 2007 024 288.5, filed on May 23, 2007, the entire contents of which are hereby incorporated by reference.

TECHNICAL FIELD

The invention relates to an arrangement for identifying a laser machining nozzle on insertion of the laser machining nozzle into a laser machining head.

BACKGROUND

The replacement of laser machining nozzles on a laser machining head of a laser machine tool, for example, on a laser welding head or on a laser cutting head, is a repetitive process.

In the case of a 2D laser cutting system for sheet metals, particular importance is attached to the laser cutting head and hence also to the cutting nozzle. To obtain improved cutting results for different thicknesses of sheet, different nozzles are used. In existing laser cutting systems, sheets of different thickness can be loaded for processing onto the machine using automatic loading devices. A change of cutting nozzle is carried out with the aid of what is called a nozzle changer. The preliminary requirement for a fully-automated nozzle change is to identify the laser machining nozzle.

SUMMARY

The system described below provides a simple and reliable identification of a mounted laser machining nozzle for an automatable laser machining nozzle change.

In one general aspect, a system identifies a laser machining nozzle inserted into a laser machining head. The system includes a geometric feature on a region of the laser machining nozzle that is insertable into the laser machining head, and a detector system that is configured to sense the geometric feature.

Implementations can include one or more of the following features. For example, the detector system can include a sensor and a detector and circuitry. The sensor, the detector, and the circuitry can be remote from the laser machining head. The sensor can be within the laser machining head, and the detector and the circuitry can be remote from the laser machining head. The sensor can include contact elements. The sensor can be formed on a base body of the laser machining nozzle. The detector can be housed in a nozzle magazine that stores a plurality of laser machining nozzles for use in the laser machining head. The sensor can include contact elements that are formed by spring-supported contact pins. The geometric feature can be a shaping and the sensor can be configured to sense the shaping.

The geometric feature can be on a side that is remote from a laser machining process. The geometric feature can be formed by a sequence of ridges and grooves. The geometric feature can be formed by a coating. The coating can be an insulating layer or a coat of lacquer.

The geometric feature can be rotationally symmetric about a longitudinal axis of the laser machining nozzle.

In another general aspect, a laser machining nozzle inserted into a laser machining head is identified by inserting a region of a laser machining nozzle into a laser machining head to enable a sensor of a detector system to sense a geometric feature on the laser machining nozzle region.

Implementations can include one or more of the following features. For example, detector system can be enabled to sense the geometric feature by enabling contact between contact pins of a sensor of the detector and ridges of the geometric feature on a side of the laser machining nozzle that is remote from a laser machining process. The contact pins can move when contacting the ridges of the feature.

In another general aspect, a laser machining process includes inserting a laser machining nozzle into a laser machining head to enable processing a workpiece, and identifying the inserted laser machining nozzle by detecting using a detector system including a sensor that detects a geometric feature on a region of the laser machining nozzle.

In a further general aspect, a laser machining system includes a laser, a workpiece, and a laser machining head that directs the laser to the workpiece and receives a laser machining nozzle. The laser machining head includes a system for identifying the laser machining nozzle inserted into the laser machining head. The system includes a geometric feature on a region of the laser machining nozzle that is insertable into the laser machining head, and a detector system including a sensor that is configured to sense the geometric feature.

Implementations can include one or more of the following features. For example, the detector system can include a detector that receives a signal output from the sensor and produces a signal that is fed to a control system for identifying the inserted laser machining nozzle. The geometric feature can include a shaping formed on a body of the laser machining nozzle that is not facing the workpiece.

An advantage of the identification system and method described herein is that the coding in the case of the mechanical manufacture of the laser machining nozzle, such as the laser cutting nozzle, for example, can be incorporated into the laser cutting nozzle as a contour. The coding can work without electrical or electronic components in the laser cutting nozzle, which is typically made of an electrically conductive material and thus makes electronic coding challenging. The coding according is especially simple to manufacture and hence especially cost-effective. The identification unit can be housed either in the laser machining head or in a nozzle magazine. The invention operates with low susceptibility to failure without electronic circuits. Contact pins of the arrangement can be individually replaced.

The invention can be used when laser machining nozzles are exchanged with the aid of a nozzle changer and a nozzle magazine. Nozzle identification can alternatively, however, be useful without a nozzle changer. The invention therefore concerns nozzle identification in general.

Further advantages and characteristics of the present invention can be gathered from the following description given by way of example only with reference to the enclosed drawings. Features mentioned above as well as below can be used either individually or in conjunction. The following description is not to be regarded as an exhaustive enumeration but rather as examples with respect to a general concept underlying the present invention.

DETAILED DESCRIPTION

Figure 1:
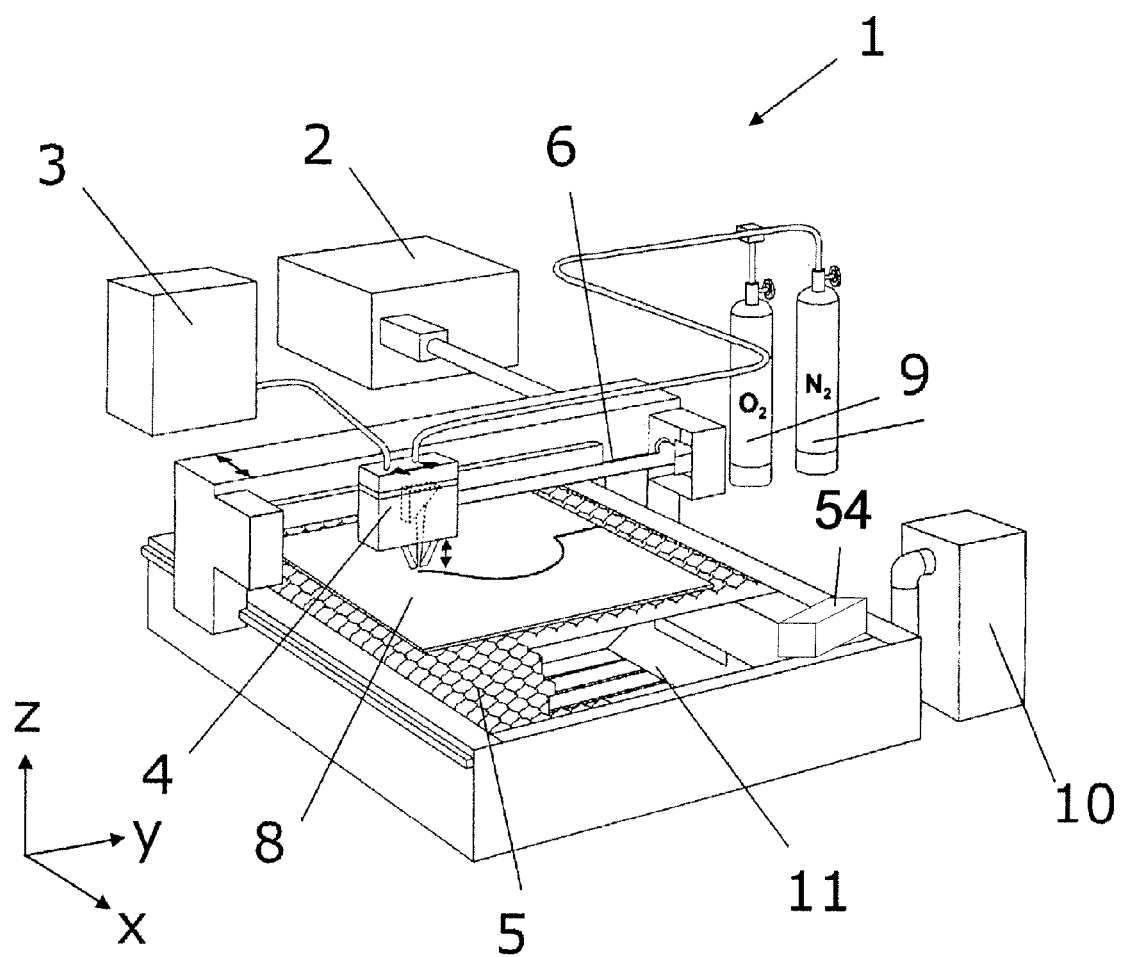
FIG. 1 is a perspective view of a laser cutting system.

FIG. 1 shows the basic construction of a laser machining system 1 for laser cutting or piercing, having a laser 2 such as a $CO_2$ laser, a control device 3, a laser machining head 4, and a workpiece support 5. A generated laser beam 6 is guided with the aid of deflecting mirrors to the laser machining head 4 and, with the aid of mirrors in the laser machining head 4, is directed onto a workpiece 8, which can be a metal sheet.

Both piercing and laser cutting are assisted by adding a gas. Oxygen, nitrogen, compressed air, application-specific gases, or combinations of these gases can be used as cutting gases 9. The gas ultimately used is dependent on which materials are being cut or pierced and which standards of quality are being demanded of the workpiece.

During cutting, operation is generally carried out with a gas pressure of up to 20 bar. Where the laser beam 6 strikes the metal sheet 8, the material is fused, oxidized, or both. The resulting molten material is blown out together with the iron oxides. Particles and gases that are produced can be extracted from a suction chamber 11 with the aid of a suction mechanism 10.

The laser machining head 4 includes a laser machining nozzle 12 (shown in FIGS. 2 and 3) and the laser machining system 1 also includes a nozzle magazine 54 that houses a plurality of the laser machining nozzles 12 that can be used in the laser machining head 4. The laser machining head 4 is moved to the nozzle magazine 54 to exchange the laser machining nozzle 12 within the head 4 with a new head from the magazine 54. The exchange can occur after finishing a first laser processing task but before beginning a second laser processing task.

Figure 2:
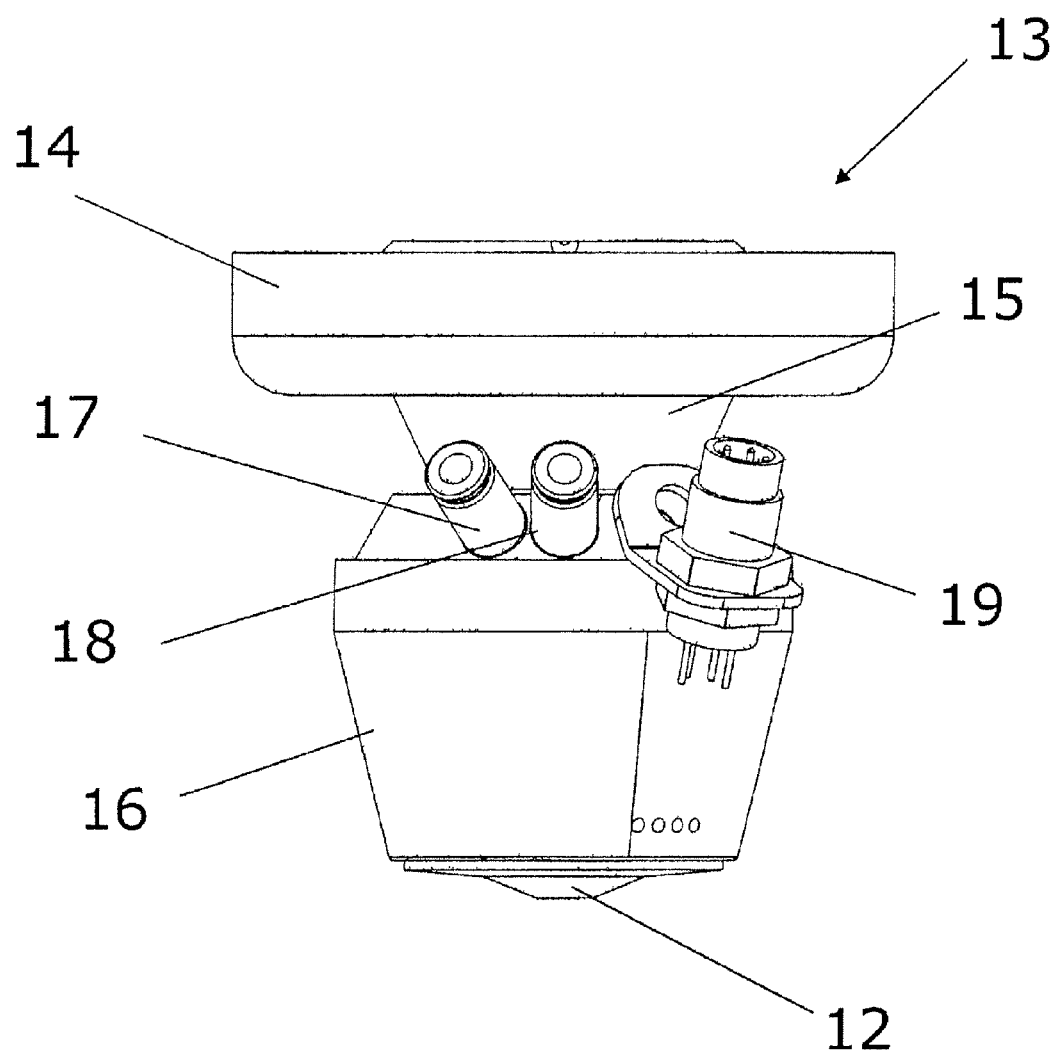
FIG. 2 is a side view of a device for changing a laser cutting nozzle on a laser cutting head of the laser cutting system of FIG. 1.
Figure 3:
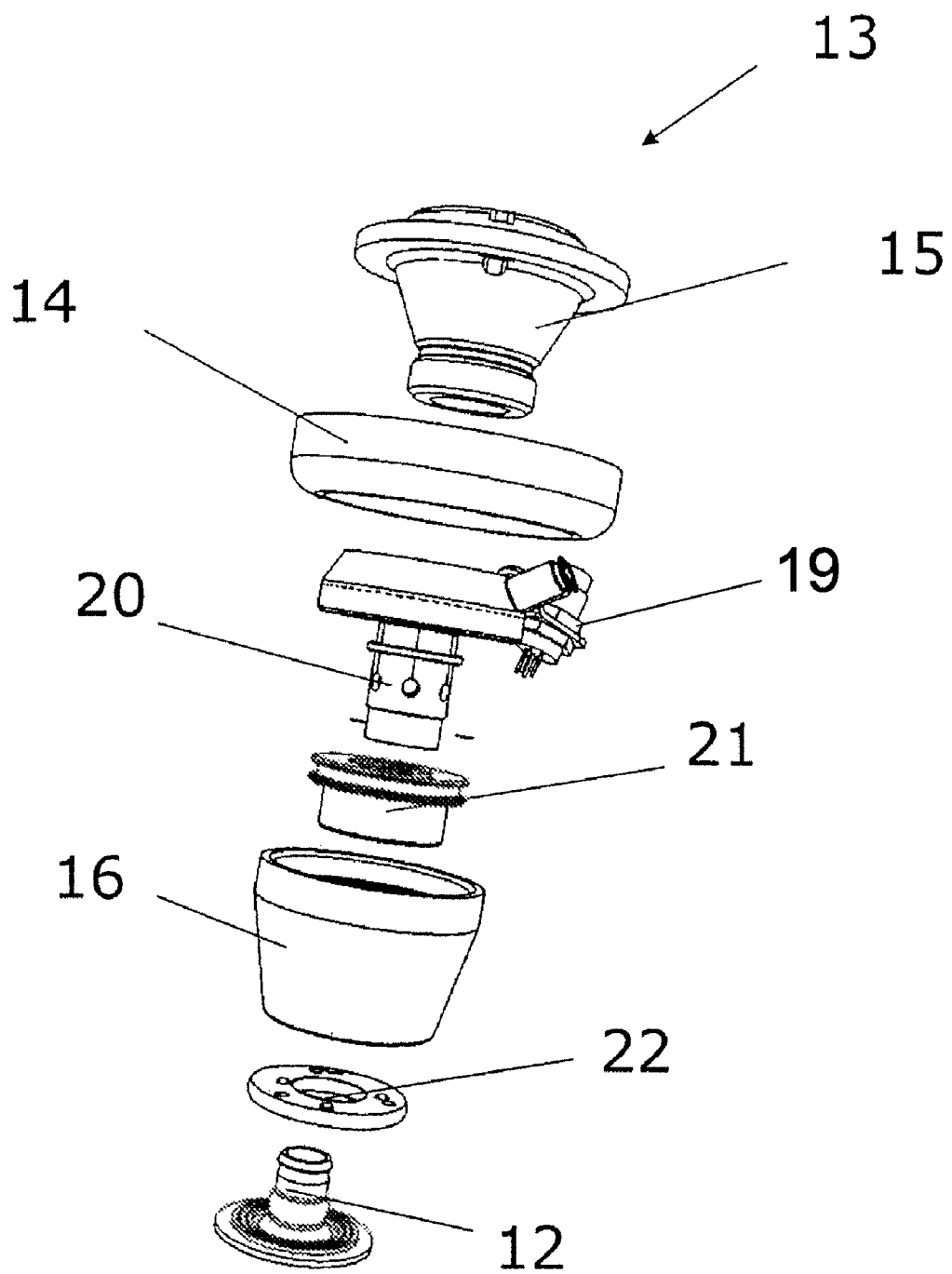
FIG. 3 is an exploded view of the device shown in FIG. 2.

Referring also to FIGS. 2 and 3, the laser machining head 4 includes a device 13 that is used to replace the laser machining nozzle (for example, a laser cutting nozzle) 12 on the laser machining head 4. The device 13 for changing the laser cutting nozzle 12 can be mounted with the aid of a connector device 14 on the laser cutting head 4. A piece 15 of dielectric material is integrated in the device 13. The device 13 includes a mechanism for changing the laser cutting nozzle 12 and the mechanism is covered by an external housing 16. In addition, a first gas connection 17 and a second gas connection 18 for a pneumatic operation of the mechanism for changing the laser cutting nozzle 12 can be seen in FIG. 2. Operation of a locking and unlocking means of the laser cutting nozzle 12 is effected pneumatically using a process gas that is already available at the laser cutting head 4. The process gas can be any gas used in laser processing including laser cutting or welding and it can include the cutting gases 9, which are discussed above. The locking and unlocking means is described in patent application DE 102007024366, which is incorporated by reference herein in its entirety. The locking and unlocking means includes a part that can be pneumatically moved for locking or unlocking of the nozzle 12.

The connector device 14 removably secures the device 13 to a laser machining head 4 and the dielectric piece 15 provides for distance control between the laser machining head 4 and the workpiece 8. The device 13 also includes a ball cage 20 and a lifting cylinder 21 that enable replacement of the laser cutting nozzle 12, and a plate 22 that is used to identify the laser cutting nozzle 12, as described in detail below.

A detector system for identifying a specific laser machining nozzle 12 is described below in detail. The detector system includes a sensor at or near the laser machining nozzle 12 and a detector and associated circuitry that can be near to or remote from the laser machining nozzle 12. The sensor can sense a coding on the laser cutting nozzle 12 and can be at least partly formed on the plate 22 of the device 13.

In other implementations, the sensor can be formed remotely from the laser machining head 4, for example, in the nozzle magazine 54 and can sense the identity of a new laser machining nozzle 12 inserted into the laser machining head 4. Moreover, the sensor can be an optical sensor if housed in the nozzle magazine 54.

Figure 4:
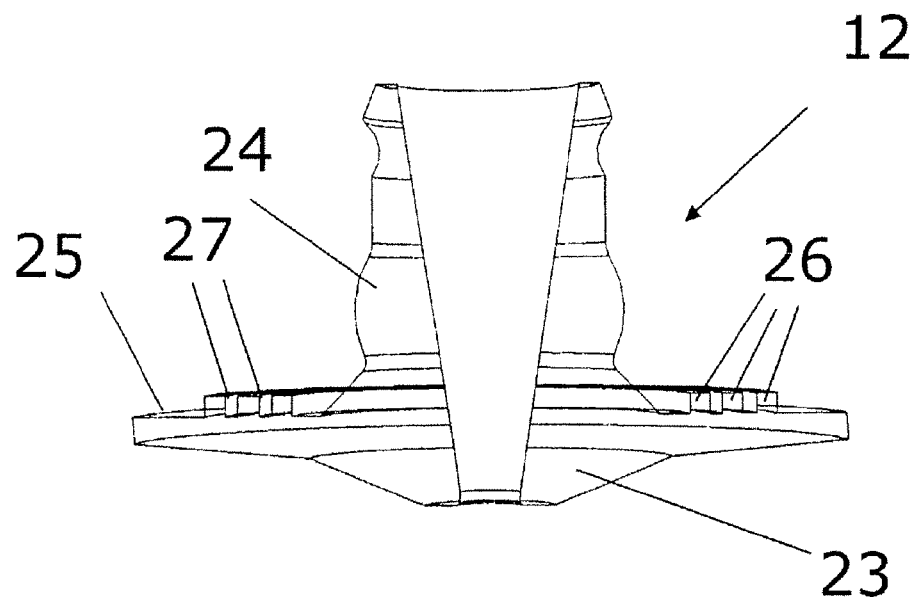
FIG. 4 is a longitudinal cross-sectional view of a laser cutting nozzle that can be used in the laser cutting system of FIG. 1.
Figure 5:
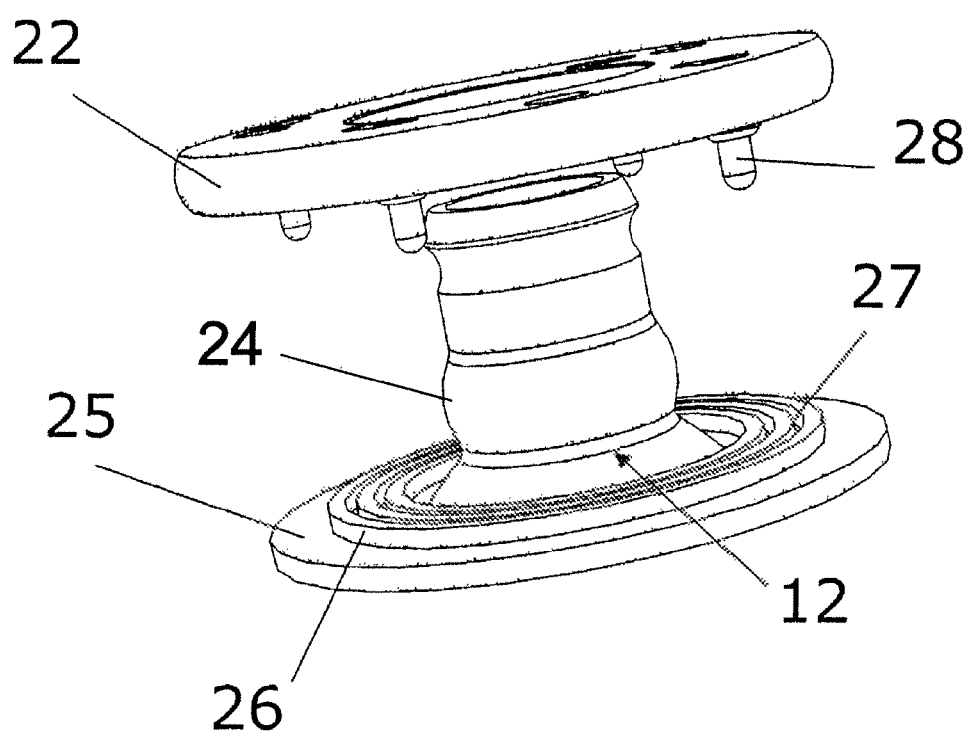
FIG. 5 is a perspective view of part of an arrangement for identifying the laser cutting nozzle used in the laser cutting system of FIG. 1.

Referring to FIGS. 4 and 5, the laser cutting nozzle 12 has a flat nozzle body 23 and a shank 24. The coding on the laser cutting nozzle 12 can include geometric features such as ridges and grooves (in the example shown, three circumferential ridges 26, which are separated from one another by grooves 27) that are arranged at a top side 25 of the nozzle body 23 remote from a workpiece or the process.

The nozzle body 23 can be made of an electrically conductive material and is formed by milling in a turning center. The grooves 27 and the ridges 26 therefore can be formed by milling or machining when forming the nozzle body 23. The ridges 26 can be formed by application of a coating to the nozzle body. In other implementations, the ridges 26, the grooves 27, or both the ridges 26 and the grooves 27 can be formed by molding them into the nozzle body 23 during manufacture of the nozzle body 23.

In other implementations, the ridges 26 can be formed as a coating that is sprayed or suitably formed on the nozzle body 23. The ridges 26 formed as a coating can have the same shape as those shown in FIG. 4, for example. The coating can be an insulating layer or a coat of lacquer.

The dielectric piece 15 provides distance control by isolating the electrically conductive nozzle body 23 from the machining head 4. The capacitance between the nozzle body 23 and the workpiece 8 to be machined is measured to determine the distance of the machining head 4 from the workpiece 8.

The circumferential arrangement of the coding is advantageous from the point of view of manufacture. It is also sensible to mount the coding on the side remote from the laser machining process because in this case, the coding is not contaminated by the laser machining operation and can still be sensed even after several hours of operation.

The sensor on the plate 22 of the device 13 includes contact pins 28 arranged to face the coding of the laser cutting nozzle 12. The contact pins 28 can be made of any suitable rigid material.

In FIG. 5, for the sake of clarity, the plate 22 and the top side 25 of the laser cutting nozzle 12 are illustrated with a substantial spacing. The contact pins 28 or any other type of sensor can be electrically connected with a detector through the contact plug 19. As an alternative to the contact pins 28, contact surfaces on the outside of the external housing 16 are possible. The detector produces an output signal that is sent to the control device 3 for identifying the nozzles 12. The detector can be located at the laser machining head 4 or remote from the laser machining head 4, for example, mounted at the workpiece support 5 or mounted at the control device 3. In one implementation, the detector is mounted to the nozzle magazine 54 that is mounted at the workpiece support 5.

Figure 6:
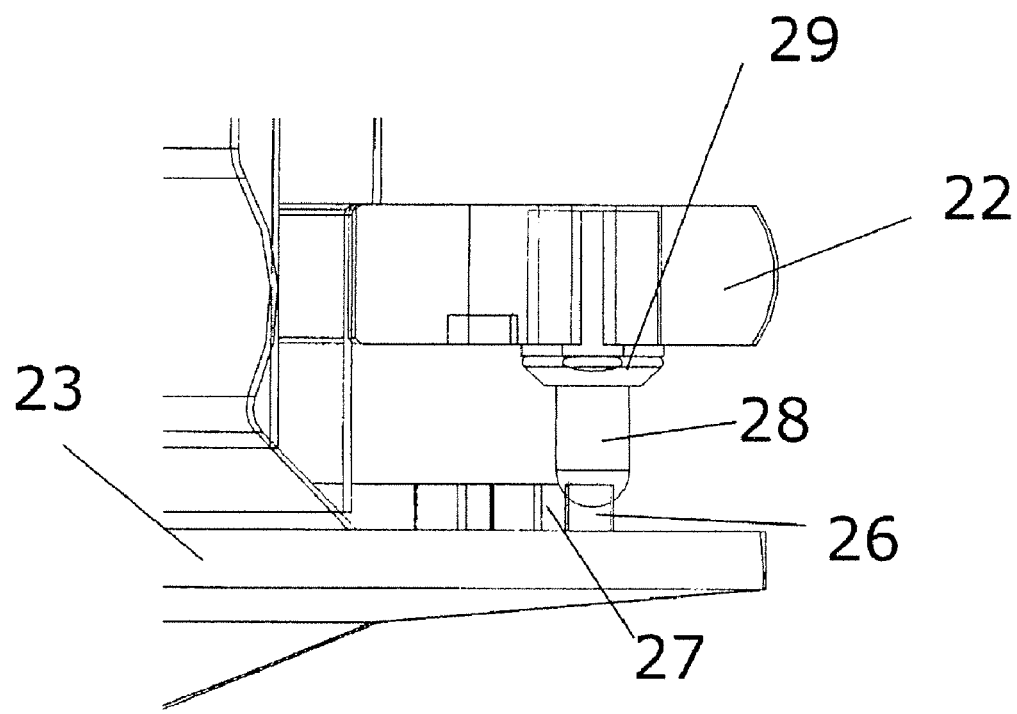
FIG. 6 shows a cross-sectional view of an enlarged scale of the arrangement of FIG. 5.

In the operational state, the contact pins 28 contact the ridges 26, to enable sensing of the ridges 26 and the grooves 27. Such a sensing is shown by way of example in FIG. 6 for a contact pin 28. The contact pin 28 is spring-supported in a sleeve 29. When the laser cutting nozzle 12 is inserted into the device 13, the ridges 26 are pressed against the contact pins 28. Such a contact and movement of the contact pins 28 triggers an electrical signal using any suitable actuation means (for example, the motion can close a switch that is coupled to an electrical current), which is transmitted to the detector through the contact plug 19 and then to the control device 3 (shown in FIG. 1).

The number, geometric arrangement, or both of ridges 26 and grooves 27 produces a coding. Through the rotationally symmetrical construction of the coding, a defined installation position of the laser cutting nozzle 12 is not required. The total possible number of ridges 26 and grooves 27 that can be formed defines the number of coding options. The coding can be associated with a specific laser cutting nozzle 12. The number of identifiable laser cutting nozzles 12 follows from that. For example, if four ridges 26 are formed, sixteen different coding options can be achieved.

Evaluation of a contact between the contact pin 28 and the ridges 26 is effected with the aid of the control device 3. The signal can be checked for plausibility.

Figure 7:
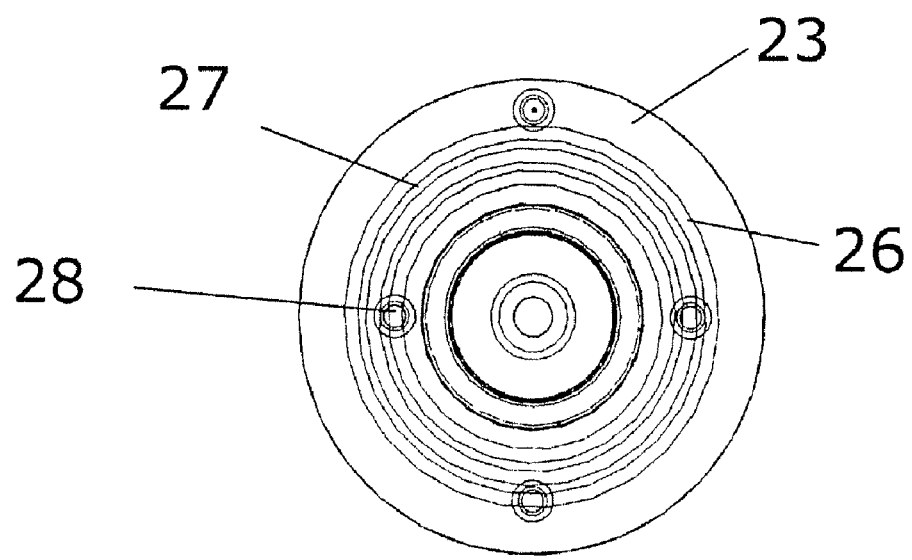
FIG. 7 is a plan view of the laser cutting nozzle of FIG. 4.

As can be seen from FIG. 7, a total of four contact pins 28 are arranged offset from one another along the radial direction and along the circumference, such that ridges 26 and grooves 27 arranged concentrically with respect to one another can be identified.

Other implementations are within the scope of the following claims.

What is claimed is:

1. A system for identifying a laser machining nozzle inserted into a laser machining head, the system comprising:
   a geometric feature on a region of the laser machining nozzle that is insertable into the laser machining head, and
   a detector system that is configured to sense the geometric feature.

2. The system of claim 1, wherein the detector system includes a sensor and a detector and circuitry.

3. The system of claim 2, wherein the sensor and the detector and circuitry are remote from the laser machining head.

4. The system of claim 2, wherein the sensor is within the laser machining head and the detector and circuitry are remote from the laser machining head.

5. The system of claim 2, wherein the sensor includes contact elements.

6. The system of claim 2, wherein the sensor is formed on a base body of the laser machining nozzle.

7. The system of claim 2, wherein the detector is housed in a nozzle magazine that stores a plurality of laser machining nozzles for use in the laser machining head.

8. The system of claim 2, wherein the sensor includes contact elements that are formed by spring-supported contact pins.

9. The system of claim 2, wherein the geometric feature is a shaping and the sensor is configured to sense the shaping.

10. The system of claim 1, wherein the geometric feature is on a side that is remote from a laser machining process.

11. The system of claim 1, wherein the geometric feature is formed by a sequence of ridges and grooves.

12. The system of claim 1, wherein the geometric feature is formed by a coating.

13. The system of claim 12, wherein the coating is an insulating layer or a coat of lacquer.

14. The system of claim 1, wherein the geometric feature is rotationally symmetric about a longitudinal axis of the laser machining nozzle.

15. A method for identifying a laser machining nozzle inserted into a laser machining head, the method comprising:
    inserting a region of a laser machining nozzle into a laser machining head to enable a sensor of a detector system to sense a geometric feature on the laser machining nozzle region.

16. The method of claim 15, wherein the detector system is enabled to sense the geometric feature by enabling contact between contact pins of a sensor of the detector and ridges of the geometric feature on a side of the laser machining nozzle that is remote from a laser machining process.

17. The method of claim 16, wherein the contact pins move when contacting the ridges of the feature.

18. A laser machining process comprising:
    inserting a laser machining nozzle into a laser machining head to enable processing a workpiece; and
    identifying the inserted laser machining nozzle by detecting using a detector system including a sensor that detects a geometric feature on a region of the laser machining nozzle.

19. A laser machining system comprising:
    a laser;
    a workpiece; and
    a laser machining head that directs the laser to the workpiece and receives a laser machining nozzle, wherein the laser machining head includes a system for identifying the laser machining nozzle inserted into the laser machining head, the system comprising:
       a geometric feature on a region of the laser machining nozzle that is insertable into the laser machining head, and
       a detector system including a sensor that is configured to sense the geometric feature.

20. The laser machining system of claim 19, wherein the detector system includes a detector that receives a signal output from the sensor and produces a signal that is fed to a control system for identifying the inserted laser machining nozzle.

21. The laser machining system of claim 19, wherein the geometric feature includes a shaping formed on a body of the laser machining nozzle that is not facing the workpiece.

* * * * *